(12) United States Patent
Huo

(10) Patent No.: US 9,169,933 B2
(45) Date of Patent: Oct. 27, 2015

(54) SAFETY DISCHARGE VALVE

(71) Applicant: Gang Huo, Dongying (CN)

(72) Inventor: Gang Huo, Dongying (CN)

(*) Notice: Subject to any disclaimer, the term of this patent is extended or adjusted under 35 U.S.C. 154(b) by 115 days.

(21) Appl. No.: 14/222,642

(22) Filed: Mar. 23, 2014

(65) Prior Publication Data

US 2014/0197346 A1    Jul. 17, 2014

Related U.S. Application Data

(63) Continuation of application No. PCT/CN2012/079478, filed on Aug. 1, 2012.

(30) Foreign Application Priority Data

Aug. 3, 2011 (CN) .......................... 2011 1 0220709

(51) Int. Cl.
*F16K 1/34* (2006.01)
*F16K 17/04* (2006.01)
*F16K 27/02* (2006.01)

(52) U.S. Cl.
CPC .............. *F16K 1/34* (2013.01); *F16K 17/0413* (2013.01); *F16K 17/0446* (2013.01); *F16K 17/0473* (2013.01); *F16K 27/0227* (2013.01); *Y10T 137/87981* (2015.04); *Y10T 137/88054* (2015.04)

(58) Field of Classification Search
CPC ....... F16K 11/02; F16K 15/18; F16K 15/181; F16K 17/00; F16K 17/0413; F16K 17/0446; Y10T 137/86928; Y10T 137/87917; Y10T 137/87925; Y10T 137/87981; Y10T 137/88054
USPC ................... 137/614.11, 614.18, 614.2, 628, 137/630.18, 630.19, 630.2
See application file for complete search history.

(56) References Cited

U.S. PATENT DOCUMENTS

| | | | | |
|---|---|---|---|---|
| 4,832,078 A | * | 5/1989 | Szekely | ................ F16K 31/44 137/553 |
| 5,314,164 A | * | 5/1994 | Smith | ................ F16K 31/0682 251/129.17 |
| 5,950,988 A | * | 9/1999 | Nardick | ................ E04G 21/04 251/299 |
| 7,406,983 B2 | * | 8/2008 | Schwartz | ............. F16K 1/2014 137/614.11 |

* cited by examiner

*Primary Examiner* — Matthew W Jellett
(74) *Attorney, Agent, or Firm* — Syncoda LLC; Feng Ma

(57) ABSTRACT

A safety discharge valve includes a siphon-type open/close device (1), a valve cover assembly (2), a valve rod (3), a valve body (4), an extensible side-sealing top-pressing assembly (5), side rotary sealing plates (6), a tapered bottom valve plug (7) and a side water inlet emergency plug (10).

7 Claims, 5 Drawing Sheets

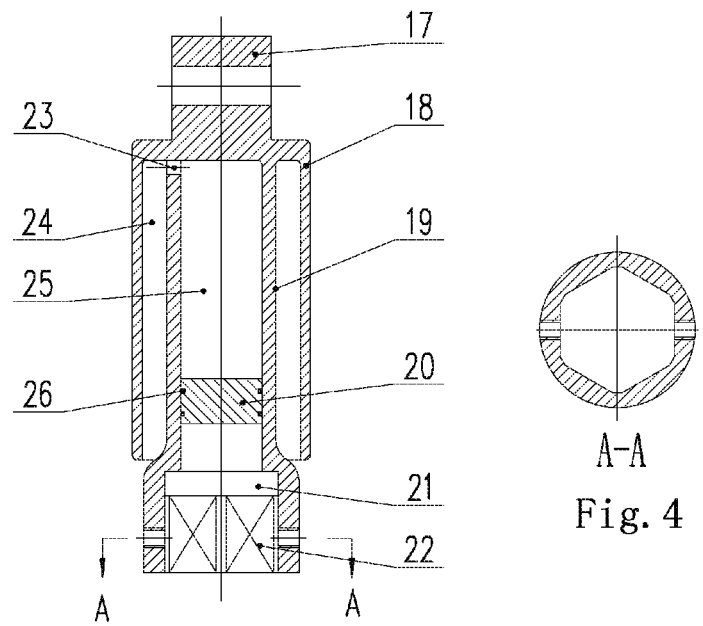
Fig. 3
Fig. 4
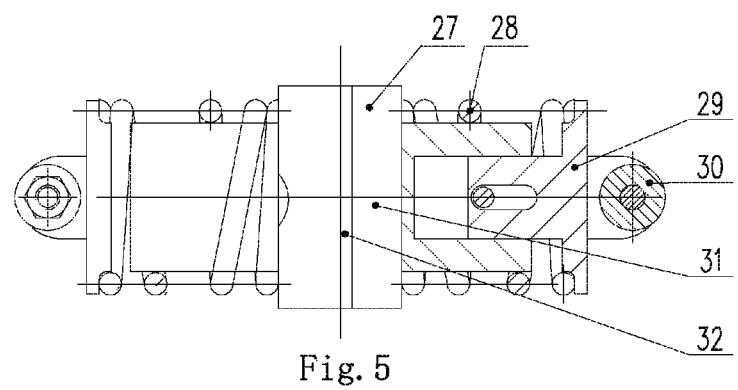
Fig. 5
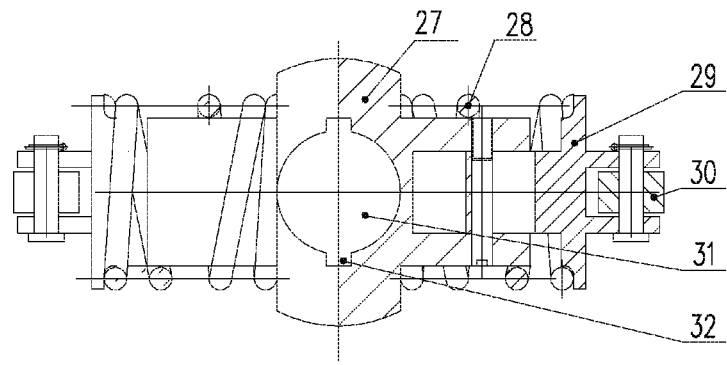
Fig. 6

SAFETY DISCHARGE VALVE

CROSS-REFERENCE TO RELATED APPLICATIONS

The present application is a continuation of, and claims priority to, PCT/CN2012/079478, filed Aug. 1, 2012, which claims priority to Chinese Patent Application No. CN 201110220709.9, filed Aug. 3, 2011. The disclosures of the above applications are hereby incorporated by reference in their entirety.

BACKGROUND

This invention relates to a valve, and specifically to a safety discharge valve that can be used in the ballast tanks of submarines and oil platforms.

The inventor had disclosed a cabin-bottom valve in 2005 (Chinese Patent Application No. 200510045517.3). In the practical application the following weaknesses of the valve have been identified:

1. The middle part of the valve rod, as well as its upper part during the period when the valve is open, is exposed to the seawater in the cabin. The erosion of marine microorganisms and the accumulated attachment of marine shellfishes impose a serious risk for valve fault, sometimes even causing the valve unable to open or close. Additionally because of the simultaneous shutdown of the bottom valve port and the side valve port, seawater is retained in the valve chamber. This causes the shellfishes to attach on the valve rod and other internal parts and may ultimately lead to valve failure.

2. The valve plate is opened or closed by sliding vertically along the guide groove. Because the valve rod, tensioner, valve plate and guide plate are all connected to the pin bushing linkage structure, the valve is unable to shut down on occasions where any connection point of the linkage structure gets jammed or damaged when the valve rod moves up or when the closed valve needs to be opened.

3. On occasions where the opened valve needs to be closed, under a variety of deleterious situations such as human operational mistakes, failure of the open/close instruction on the valve driving mechanism, or disconnection between the valve and the driving mechanism, the bottom valve disc and the side valve plates cannot automatically move back to close the valve. This will cause the seawater to pour through the bottom port into the valve chamber, and further through the side port into the cabin, imposing a significant danger to the safety of submarines or oil platforms.

4. On occasions where the valve needs to shut down but fails so because foreign object obstruction occurs between the side valve plates and the side water inlets, the valve rod cannot move down due to its linkage with the tensioner and the side valve plates, which also causes the bottom valve disc not able to securely shut down the bottom valve outlet. This will cause the seawater to pour into the cabin and may lead to severe accidents.

5. On occasions where the valve needs to shut down but foreign object obstruction occurs between the bottom valve disc and the bottom water outlet, the valve rod cannot move down to carry the bottom valve disc to shut down the bottom water outlet. The side valve plates also cannot move down to shut down the side water inlets due to their linkage with the tensioner and the valve rod. This will cause the seawater to pour through the bottom outlet into the valve chamber, and further through the side water inlets into the cabin, imposing a significant danger to the safety of submarines or oil platforms.

6. On occasions where the valve cannot shut down because the foreign object obstruction occurs simultaneously between the bottom valve disc and bottom water outlet, and between the side valve plates and the side water inlets, the seawater will pour into the cabin in the absence of emergency plugging devices. This will cause ballast imbalance and may ultimately lead to oil platform capsizing.

7. On occasions where the valve bottom and the bottom valve disc are damaged due to accidental collision, the valve rod may be distortionally deformed. Because of the linkage structure of the valve, the deformed valve rod will result in failed sealing between the side valve plates and the side water inlets. This may cause the seawater to pour into the cabin.

Currently there have been no technical solutions to these potentially fatal flaws of this art.

SUMMARY

The purpose of this invention is to overcome the aforementioned fatal flaws in the current art, and to develop a novel cabin-bottom valve that can be used in the ballast tanks on submarines or offshore oil platforms for the safe discharge of ballast water. This valve has eight safety features: 1. The valve can still automatically shut down on occasions where the valve driving mechanism is accidentally disconnected; 2. The valve can still automatically shut down on occasions where the valve bottom is accidentally damaged; 3. The bottom valve port can still shut down on occasions where the side port is unable to close due to faults or failures; 4. The side valve port can still automatically shut down on occasions where the bottom port is unable to close due to faults or failures; 5. The valve can automatically shut down on occasions where it is mistakenly opened; 6. The valve can have an emergency shutdown on occasions where there are simultaneous failures on both the bottom port and side port; 7. There are no valve faults/failures caused by linkage between the valve parts; 8. There are no valve faults/failures caused by erosion of and accumulated attachment on the valve rod by marine organisms.

The purpose of the invention is achieved in the following manner. This invention relates to a safety discharge valve, the structure whereof comprises a siphon-type open/close device, a valve cover assembly, a valve rod, a valve body, an extensible side-sealing top-pressing assembly, side rotary sealing plates, a tapered bottom valve plug and a side water inlet emergency plug. The siphon-type open/close device is connected to the upper part of an open/close nut on the valve cover assembly through an inserted sealing connection. The top of the valve rod is slidably connected with the center of the valve cover assembly and is sealed inside a sealed valve rod cavity, below the bottom of the piston and above a sealing filler in the siphon-type open/close device. The lower part of the valve rod is arranged inside of the valve body. The side of the valve body is provided with side water inlets, and the bottom of the valve body is provided with a tapered bottom water outlet. The lower end of the valve rod is connected with a tapered bottom valve plug. The lower tapered part of the tapered bottom valve plug is matched with the tapered bottom water outlet. The extensible side-sealing top-pressing assembly is arranged on the top of the tapered bottom valve plug via a guide piece on the valve rod. The top of the extensible side-sealing top-pressing assembly presses upon a holding piece on the valve rod. The two top ends of each side of the extensible side-sealing top-pressing assembly press upon the smooth back surface of the side rotary sealing plates in rolling-sliding contact therewith. The upper parts of the side rotary sealing plates are rotatably connected with the suspension brackets on the inner wall of the valve body through hinge pieces. The front sealing surfaces of the side rotary sealing plates fittingly connect with the inner sealing surfaces of the side water inlets. The smooth back surfaces of the side rotary sealing plates are inclined at an angle of five degrees relative to the central axis of the valve rod. The side water inlet emergency plug is extractably connected with an extractable cap on the valve cover assembly.

The siphon-type open/close device comprises a downward opening container cover, an inner main bushing body and a piston. The top end of the downward opening container cover features an external drive connector. The top inner wall of the downward opening container cover is connected with the inner main bushing body. The piston chamber in the inner main bushing body contains the piston. The piston is slidably seal-connected with the inner wall of the inner main bushing body through a sealing ring. The lower part of the inner main bushing body is provided with a connector. Inside the connector an annular seal surface is provided. The top end of the inner main bushing body is provided with a through-hole that connects the piston chamber with the breathing chamber. The volume of the breathing chamber below the lowest point of the through-hole is larger than the volume of the piston chamber between the upper surface of the piston and the lowest point of the through-hole when the piston is at its lowest position.

The extensible side-sealing top-pressing assembly comprises a main body, an extensible piece, a connecting piece, and a roller or a smooth contact head. The inner wall of the longitudinal hole within the main body is provided with a longitudinal guide groove. The extensible piece is arranged between each of the two ends of the main body and the connecting piece. Each of the two top ends of the connecting piece is provided with a roller or a smooth contact head.

Each of the side rotary sealing plates is provided with an arc-shaped hanger, a hanging hole, a smooth touch surface, and a front sealing surface.

The side water inlet emergency plug comprises a tension disc, a fixed disc, a rubber seal and a rotary handle nut. The outside of the tension disc is cone-shaped, and its inside is provided with a stud. The stud slides through the center hole of the fixed disc and connects with the rotary handle nut. The fixed disc is in fitting contact with the positioning bore surface of the rubber seal. The bore of the rubber seal is cone-shaped, and the inner conical surface of the bore is in fitting contact with the outer conical surface of the tension disc. The rubber seal has a cylindrical outer surface, with its diameter the size such that it can be slidably inserted into the side water inlet. The outer bottom of the tension disc is provided with a socket. Inside the socket is arranged a fastening ring. A gap cavity is arranged between the tension disc and the fixed disc.

The piston in the siphon-type open/close device is slidably seal-connected with the inner wall of the inner main bushing body through a sealing ring. The upper part of the open/close nut in the valve cover assembly and the siphon-type open/close device are plug connected and sealed by the sealing ring. The sealing pieces are sequentially arranged between the open/close nut, the gland bush, the bracket, the spinning sleeve and the gland cover. The space between the gland cover and the annular stuffing slot on the valve cover is filled with sealing fillers, and further seal-connected to the valve rod. The outer part of the guide and positioning bolt is provided with a fixing nut. Sealing gaskets are placed between the bracket and the fixing nut, and between the fixing nut and the head nut. The space below the bottom of the piston and above the sealing filler in the siphon-type open/close device constitutes a sealed valve rod cavity.

The outer bottom of the valve body is provided with a flange.

The holding piece can be a protruding column that sticks from the valve rod body or a column-spring combination.

Merits of this invention are as follows: 1. It eliminates the risk for jamming caused by external factors. The valve rod outside the valve chamber is enclosed in the sealed valve rod cavity which is composed by the siphon-type open/close device and the valve cover assembly. This arrangement insulates the valve rod from the ballast seawater in the cabin, eliminating the risk for valve faults/failures caused by erosion and accumulated attachment of the marine organisms. During the period when the valve is being shut down while the bottom water outlet is not yet closed, the rollers at the two ends of the extensible side-sealing top-pressing assembly have precedingly moved down to contact and press the side rotary sealing plates. This counteracts the pressure on the side rotary sealing plates from the water in the ballast tank outside the valve, then the water in the valve chamber will be completely released from the bottom water outlet at the time lag between the side water inlet shutdown and the subsequent bottom water outlet shutdown driven by the moving down of the valve rod. This precludes the growth and attachment of marine shellfishes on the valve rod and other valve parts, eliminating the potential risk for accidents caused by valve fault/failure.

2. It eliminates the risk for valve fault/failure caused by fault at one single connection point in the traditional linkage structure of the valve. By separating the valve plates from the linkage structure, it removes the interference of other linked parts on the valve plates, which allows the valve plates to be able to automatically shut down under the force of their own gravity. On occasions where the seawater pours through the bottom valve outlet into the valve chamber, the water pressure will press the valve plates to seal tightly because of their unidirectional configuration.

3. The valve possesses several safety features even when valve fault/failure occurs: 1) The valve remains safe under various deleterious situations such as loss of control over the valve driving mechanism, human operational mistakes, or accidents-c damage of the valve bottom. (i). On occasions where the open valve needs to be closed, such as when malfunction of the valve driving mechanism occurs, the valve fails to shut down due to its disconnection with the driving mechanism, the side rotary sealing plates will automatically close under the force of their own gravity and further to tightly seal under the pressure of the water pouring through the bottom outlet into the valve chamber; (ii). On occasions where the valve is mistakenly opened, the side rotary sealing plates will automatically shut down the side water inlets under the force of their own gravity and the pressure of the water pouring through the bottom outlet into the valve chamber; (iii) On occasions where the valve is closed but the valve bottom and the bottom water outlet are damaged and the valve rod is distortionally deformed due to accidental collision, the pressing on the side rotary sealing plates by the elastic piece of the extensible side-sealing top-pressing assembly will be able to prevent the side rotary sealing plates from losing the sealing caused by their linkage with the extensible side-sealing top-pressing assembly. Additionally the side rotary sealing plates are suspended independently from the joint structure, which can further enhance the sealing under the pressure of the water pouring into the valve chamber. This feature can effectively prevent seawater from pouring into cabin, and further avoid the submarine ballast imbalance and oil platform capsizing; 2) The bottom water outlet can still shut down on occasions where the side water inlets cannot close due to foreign object obstruction. When foreign object obstruction occurs between the side rotary sealing plates and the side water inlets such that the side water inlets cannot shut down, the extensible side-sealing top-pressing assembly will be able to retract under the counter pressure, which allows the valve rod to be able to further move down and drive the tapered bottom valve plug to shut down the bottom water outlet, preventing the seawater from pouring into the cabin; 3) The side water inlets can still shut down on occasions where the bottom outlets cannot close due to foreign object obstruction. When foreign object obstruction occurs between the tapered bottom valve plug and the bottom water outlet, the side rotary sealing plates can still automatically move down to shut down the bottom outlet, and at the same time the top ends of the extensible side-sealing top-pressing assembly have precedingly moved down to press the side rotary sealing plates and shut down the side inlets, preventing the seawater from pouring into the cabin; 4) On occasions where the valve cannot close because foreign object obstruction occurs simultaneously between the tapered bottom valve plug and the bottom water outlet and between the side rotary sealing plates and the side water inlets, the side water inlet emergency plug allows for the emergency shutdown on the side water inlets. This can prevent the seawater from pouring into the cabin and further avoid the submarine ballast imbalance and oil platform capsizing.

BRIEF DESCRIPTION OF THE DRAWINGS

FIG. 3 is the front view of the siphon-type open/close device.

FIG. 4 is the A-A cross-section view of the siphon-type open/close device.

FIG. 5 is the front view of the extensible side-sealing top-pressing assembly.

FIG. 6 is the top view of the extensible side-sealing top-pressing assembly.

Figure 1:
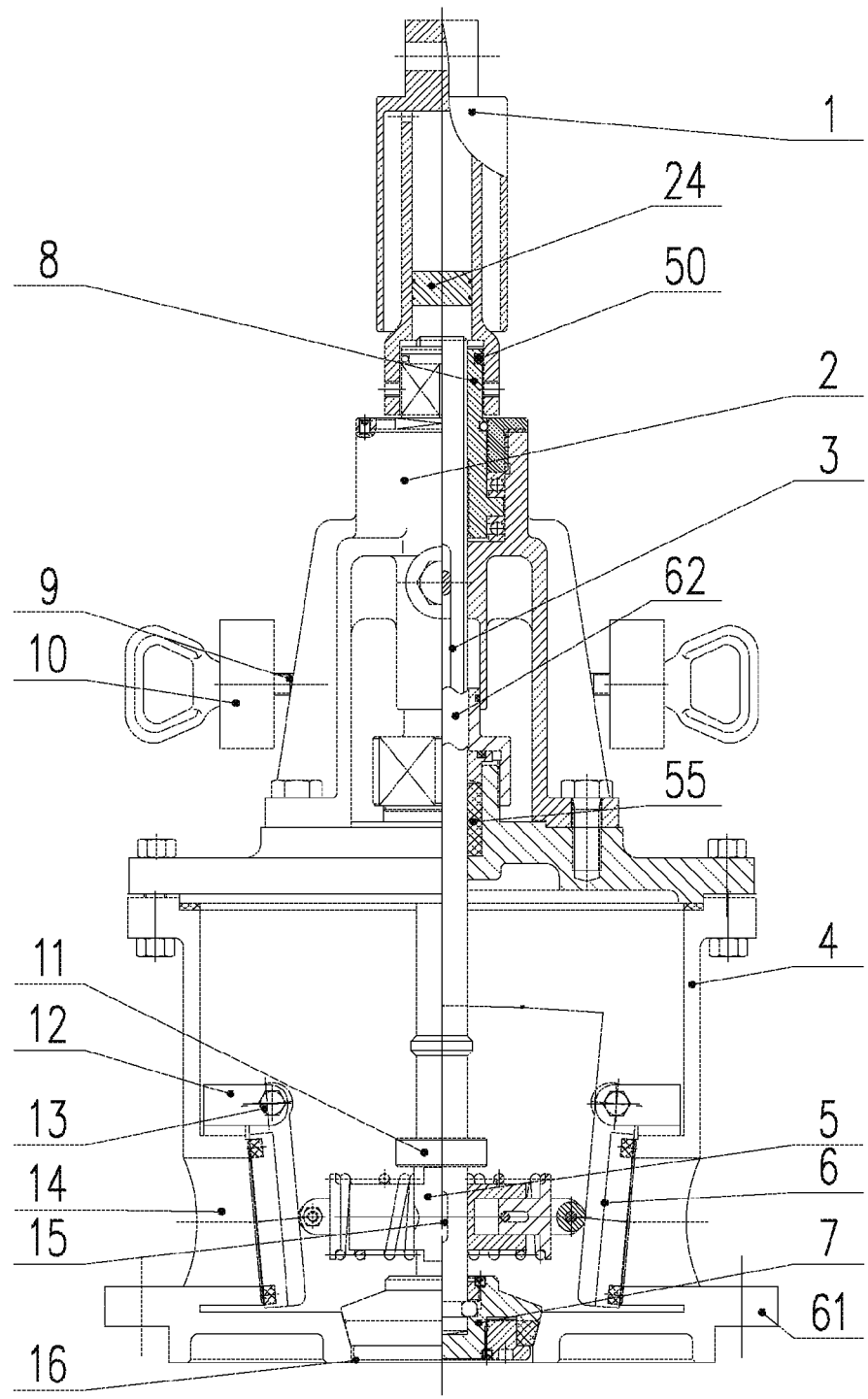
FIG. 1 is the front view of the safety discharge valve.

FIGURE LEGENDS siphon-type open/close device 1, valve cover assembly 2, valve rod 3, valve body 4, extensible side-sealing top-pressing assembly 5, side rotary sealing plates 6, tapered bottom valve plug 7, open/close nut 8, plug contacts 9, side water inlet emergency plug 10, holding piece 11, suspension brackets 12, hinge piece 13, side water inlet 14, guide piece 15, tapered bottom water outlet 16, external drive connector 17, downward opening container cover 18, inner main bushing body 19, piston 20, annular sealing surface 21, connector 22, through-hole 23, breathing chamber 24, piston chamber 25, sealing ring 26, main body 27, extensible piece 28, connecting piece 29, roller or smooth contact head 30, longitudinal hole 31, longitudinal guide groove 32, arc-shaped hanger 33, hanging hole 34, smooth back surface 35, front sealing surfaces 36, tension disc 37, fixed disc 38, rubber seal 39, rotary handle nut 40, stud 41, socket 42, fastening ring 43, gap cavity 44, gland bush 45, bracket 46, spinning sleeve 47, gland cover 48, valve cover 49, sealing ring 50, sealing piece 51, 52, 53, 54, sealing filler 55, sealing gasket 56, fixing nut 57, sealing gasket 58, head nut 59, guide and positioning bolts 60, flange 61, sealed valve rod cavity 62.

DETAILED DESCRIPTION

Detailed description of one embodiment of the safety discharge valve in reference to the drawings.

Figure 2:
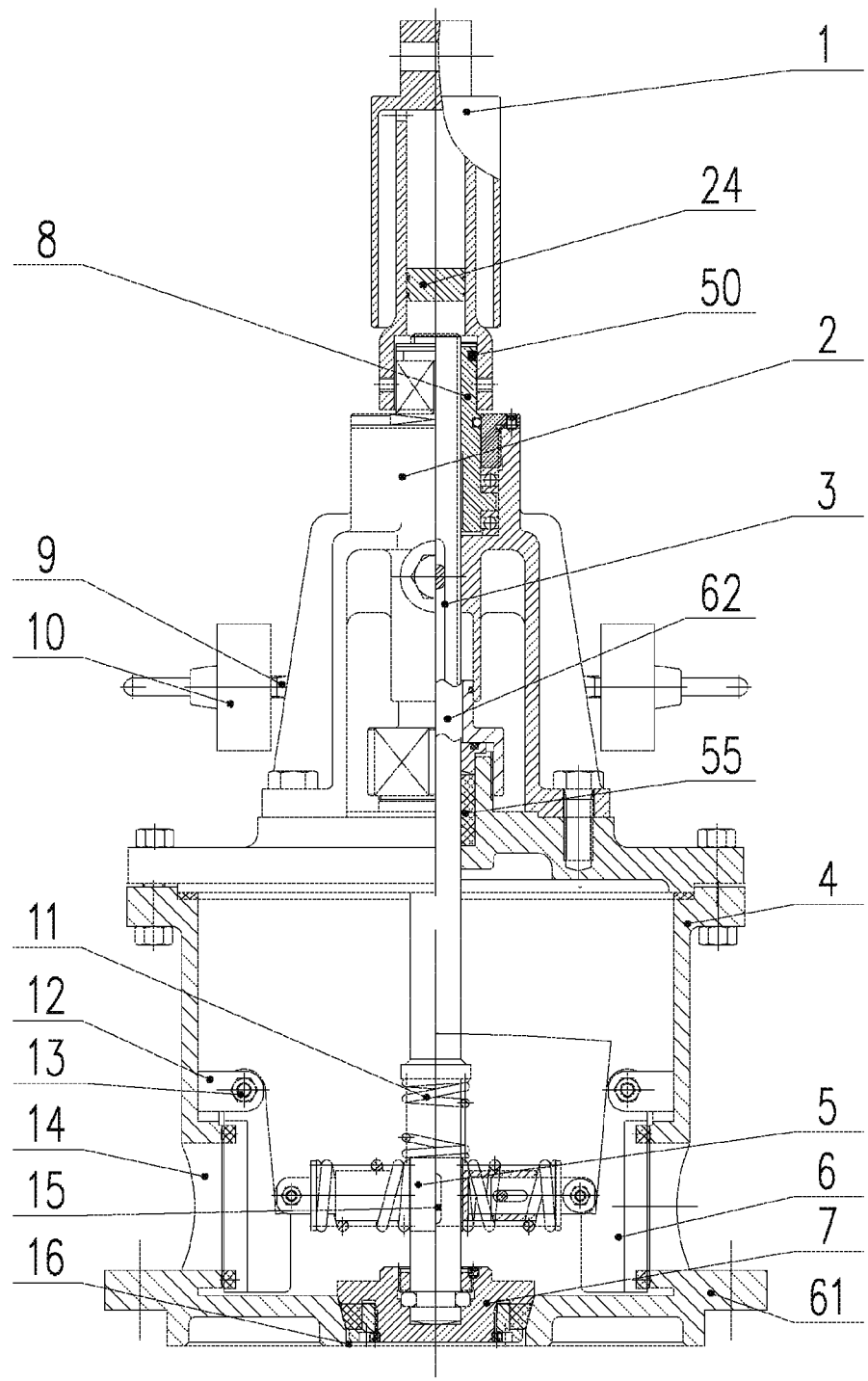
FIG. 2 shows one embodiment of the safety discharge valve.

As shown in FIGS. 1 and 2, a safety discharge valve, the structure whereof comprises a siphon-type open/close device 1, a valve cover assembly 2, a valve rod 3, a valve body 4, an extensible side-sealing top-pressing assembly 5, side rotary sealing plates 6, a tapered bottom valve plug 7 and a side water inlet emergency plug 10. The siphon-type open/close device 1 is connected to the upper part of an open/close nut 8 of the valve cover assembly 2 through an inserted sealing connection. The top of the valve rod 3 is slidably connected with the center of the valve cover assembly 2 and is sealed inside a sealed valve rod cavity 62, below the bottom of the piston 24 and above a sealing filler 55 in the siphon-type open/close device 1. The lower part of the valve rod 3 is arranged inside of the valve body 4. The two sides of the valve body 4 are provided with two side water inlets 14 and the bottom of the valve body 4 is provided with a tapered bottom water outlet 16. The lower end of the valve rod 3 is connected with a tapered bottom valve plug 7. The lower tapered part of the tapered bottom valve plug 7 is matched with the tapered bottom water outlet 16. The extensible side-sealing top-pressing assembly 5 is arranged on the top part of the tapered bottom valve plug 7 via a guide piece 15 on the valve rod 3. The top of the extensible side-sealing top-pressing assembly 5 presses upon a holding piece 11 on the valve rod 3. The two top ends of each side of the extensible side-sealing top-pressing assembly 5 press upon the smooth back surface of the side rotary sealing plates 6 in rolling-sliding contact therewith. The upper parts of the side rotary sealing plates 6 are rotatably connected with suspension brackets 12 on the inner wall of the valve body 4 through hinge pieces 13. The front sealing surfaces of the side rotary sealing plates 6 fittingly connect with the inner sealing surfaces of the side water inlets 14. The smooth back surfaces of the side rotary sealing plates 6 are inclined at an angle of five degrees relative to the central axis of the valve rod 3. The side water inlet emergency plug 10 is extractably connected with an extractable cap 9 on the valve cover assembly 2.

As shown in FIGS. 3 and 4, The siphon-type open/close device comprises a downward opening container cover 18, an inner main bushing body 19 and a piston 20. The top end of the downward opening container cover 18 features an external drive connector 17. The top inner wall of the downward opening container cover 18 is connected with the inner main bushing body 19. The piston chamber 25 in the inner main bushing body 19 contains the piston 20. The piston 20 is slidably seal-connected with the inner wall of the inner main bushing body 19 through a sealing ring 26. The lower part of the inner main bushing body 19 is provided with a connector 22. Inside the connector 22 an annular seal surface 21 is provided. The top end of the inner main bushing body 19 is provided with a through-hole 23 that connects the piston chamber 25 with the breathing chamber 24. The volume of the breathing chamber 24 below the lowest point of the through-hole 23 is larger than the volume of the piston chamber 25 between the upper surface of the piston 20 and the lowest point of the through-hole 23 when the piston 20 is at its lowest position.

As shown in FIGS. 5 and 6, the extensible side-sealing top-pressing assembly comprises a main body 27, an extensible piece 28, a connecting piece 29, and a roller or a smooth contact head 30. The inner wall of the longitudinal hole 31 within the main body 27 is provided with a longitudinal guide groove 32. The extensible piece 28 is arranged between each of the two ends of the main body 27 and the connecting piece 29. Each of the two top ends of the connecting piece 29 is provided with a roller or a smooth contact head 30.

Figure 7:
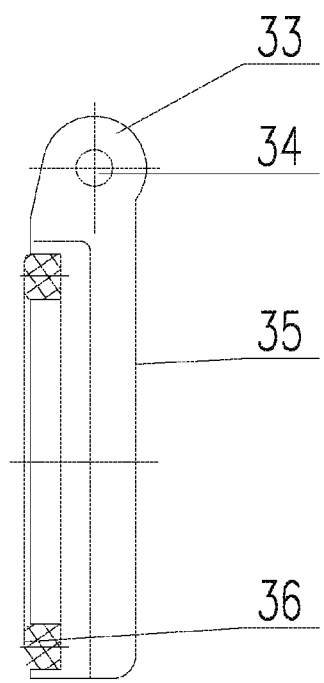
FIG. 7 is the front view of the side rotary sealing plates.
Figure 8:
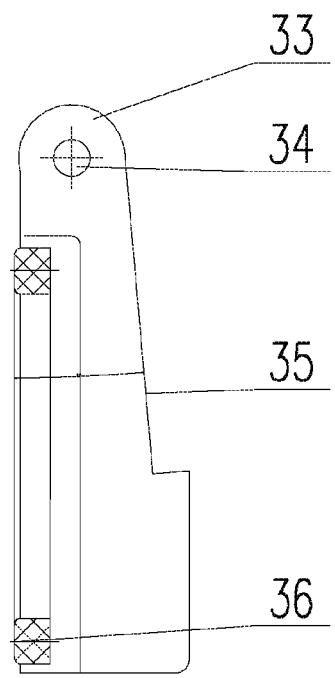
FIG. 8 shows one embodiment of the side rotary sealing plates.

As shown in FIGS. 7 and 8, each of the side rotary sealing plates is provided with an arc-shaped hanger 33, a hanging hole 34, a smooth touch surface 35, and a front sealing surface 36.

Figure 9:
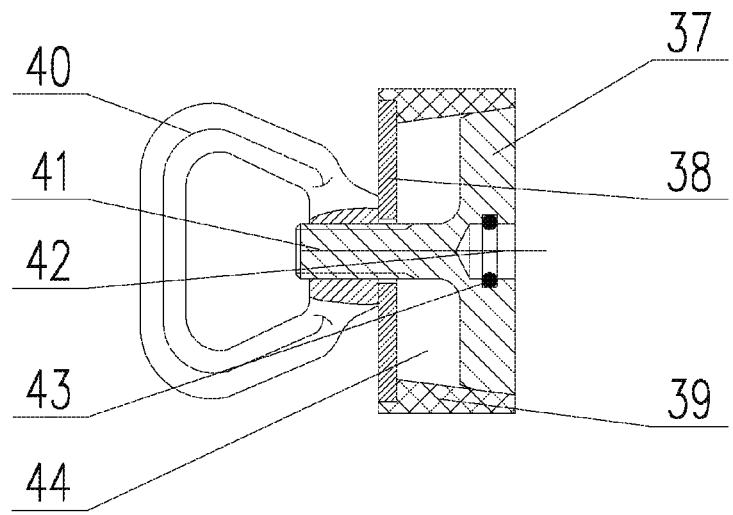
FIG. 9 is the front view of the side water inlet emergency plug.

As shown in FIG. 9, the side water inlet emergency plug comprises a tension disc 37, a fixed disc 38, a rubber seal 39 and a rotary handle nut 40. The outside of the tension disc 37 is cone-shaped, and its inside is provided with a stud 41. The stud 41 slides through the center hole of the fixed disc 38 and connects with the rotary handle nut 40. The fixed disc 38 is in fitting contact with the positioning bore surface of the rubber seal 39. The bore of the rubber seal 39 is cone-shaped, and the inner conical surface of the bore is in fitting contact with the outer conical surface of the tension disc 37. The rubber seal 39 has a cylindrical outer surface, with its diameter the size such that it can be slidably inserted into the side water inlet 14. The outer bottom of the tension disc 37 is provided with a socket 42. Inside the socket is arranged a fastening ring 43. A gap cavity 44 is arranged between the tension disc 37 and the fixed disc 38.

Figure 10:
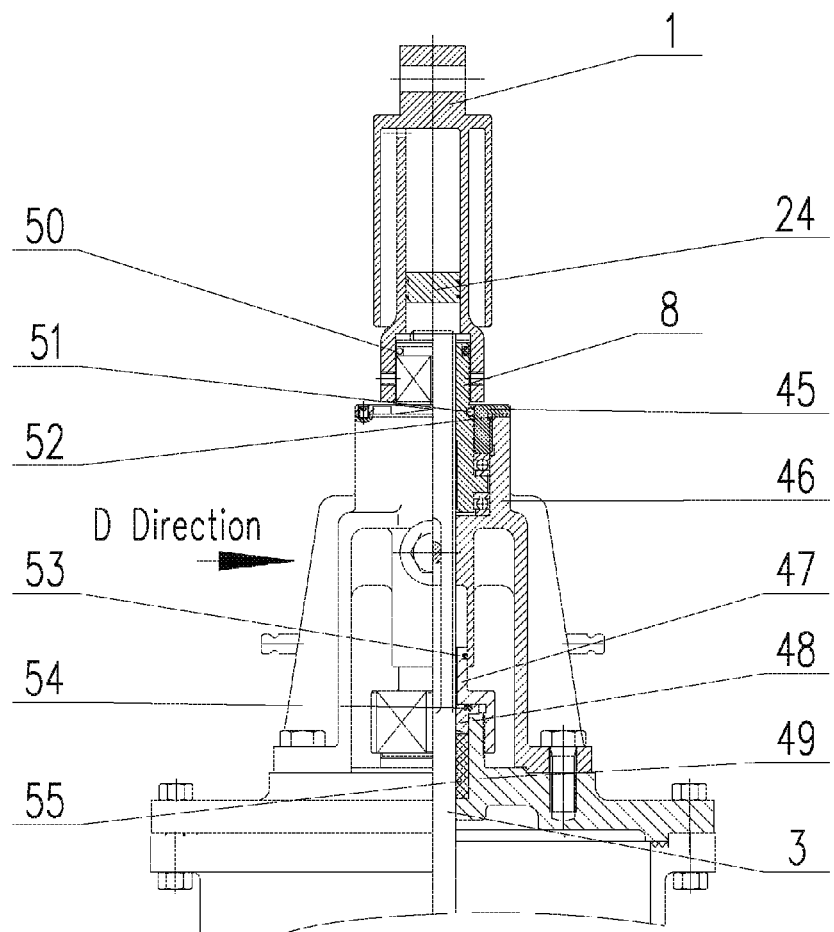
FIG. 10 is the cross-section view of the sealed valve rod cavity.
Figure 11:
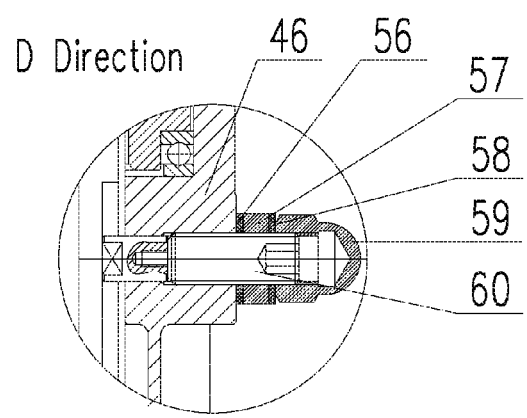
FIG. 11 is the partial enlarged D-direction view of the sealed valve rod cavity.

As shown in FIGS. 10 and 11, the sealed valve rod cavity is designed such that the piston 20 in the siphon-type open/close device 1 is slidably seal-connected with the inner wall of the inner main bushing body 19 through a sealing ring 26. The upper part of the open/close nut 8 in the valve cover assembly 2 and the siphon-type open/close device 1 are plug connected and sealed by a sealing ring 50. The sealing pieces 51, 52, 53, 54 are sequentially arranged between the open/close nut 8, the gland bush 45, the bracket 46, the spinning sleeve 47 and the gland cover 48. The space between the gland cover 48 and the annular stuffing slot on the valve cover 49 is compressed with sealing fillers 55, and further seal-connected to the valve rod 3. The outer part of the guide and positioning bolt 60 is provided with a fixing nut 57. Sealing gaskets 56, 58 are placed between the bracket 46 and the fixing nut 57, and between the fixing nut 57 and the head nut 59. The space below the bottom of the piston 24 and above the sealing filler 55 in the siphon-type open/close device 1 constitutes a sealed valve rod cavity 62.

The working mechanisms for the extensible side-sealing top-pressing assembly and the safety discharge valve are as follows:

The opening and closing of the valve is driven by the driving device connected to the valve. Specifically the driving device first drives the rotation of the siphon-type open/close device, which in turn spins the open/close nut and subsequently drives the valve rod to slide up and down in the sealed valve rod cavity, ultimately leading to the opening and closing of the valve.

In the process of valve opening, moving up of the valve rod causes an increase of the air pressure within the lower piston chamber which in turn pushes the piston to move up. The air in the upper piston chamber flows into the breathing chamber via the through-hole. In the process of valve closing, moving down of the valve rod causes the lower piston chamber to have a negative air pressure and in turn drives the piston to move down. Because the volume of the breathing chamber is larger than that of the piston chamber on top of the piston, the pressure of the air inside the breathing chamber causes the water in the ballast tank of submarines or oil platforms unable to all pour into the breathing chamber. In the both processes of valve opening and closing, the water level inside the breathing chamber is all the time maintained below the lowest point of the through-hole, thus preventing the seawater to pour into the piston chamber. In addition, the condensate (water) derived from the air that comes from the breathing chamber and get into the piston chamber via the through-hole, is blocked by the piston to exert any erosion effect on the valve rod. Furthermore, in the process of valve opening, the piston moves up to the lowest point of the through-hole, allowing the condensate to be released out of the piston chamber via the through-hole. During the period when the valve is being shut down while the bottom water outlet is not yet closed, the rollers at the two ends of the extensible side-sealing top-pressing assembly have precedingly moved down to contact the smooth back surface and to further press the side rotary sealing plates. This counteracts the pressure on the side rotary sealing plates from the water in the ballast tank outside the valve, then the water in the valve chamber will be completely released from the bottom water outlet at the time lag between the side water inlet shutdown and the subsequent bottom water outlet shutdown caused by moving down of the valve rod. This precludes the growth and attachment of marine shellfishes on the valve rod and other valve parts.

In the process of valve opening, with the valve rod moving up, the rollers on the two top ends of the extensible side-sealing top-pressing assembly also move up along the tilted smooth back surface of side rotary sealing plates, gradually releasing the pressure on the side rotary sealing plates. Once the rollers detach from the side rotary sealing plates, the side rotary sealing plates will be opened under the pressure of the water outside the valve body, and the lower tapered bottom valve plug will also move up with the valve rod, thus opening the bottom water outlet. This process allows the discharge of water from the ballast tanks on submarines or oil platforms.

In the process of valve closing, with the valve rod moving down, the rollers at the two top ends of the extensible side-sealing top-pressing assembly have precedingly moved down to contact and press the smooth back surface of the side rotary sealing plates. This counteracts the pressure on the side rotary sealing plates from the ballast water outside the valve, allowing the subsequent shutdown of the side water inlets. In addition, the further moving down of the rollers at the two top ends of the extensible side-sealing top-pressing assembly also enhances the sealing on the side water inlets. Furthermore, the valve rod can also drive the tapered bottom valve plug to move down to shut down the bottom water outlet.

In the process of valve closing, if foreign object obstruction occurs between the side rotary sealing plates and the side water inlets, the extensible side-sealing top-pressing assembly can retract under the counter pressure exerted by the side rotary sealing plates. The rollers can still continue moving down along the smooth back surface, which allows the valve rod to continue moving down and subsequently to drive the tapered bottom valve plug to shut down the bottom water outlet. This feature prevents the seawater from pouring into the cabin and avoids the danger for ballast imbalance and capsizing of submarines and oil platforms.

In the process of valve closing, if foreign object obstruction occurs between the tapered sealing surface of the tapered bottom valve plug and the sealing surface of the bottom water outlet, the rollers on the two top ends of the extensible side-sealing top-pressing assembly have precedingly moved down to touch and press the smooth back surface of the side rotary sealing plates. This counteracts the pressure on the side rotary sealing plates from the ballast water outside the valve, allowing for the shutdown of the side water inlets. This feature prevents the seawater from pouring into the cabin and avoids the danger for ballast imbalance and capsizing of submarines and oil platforms.

In the process of valve closing, if foreign object obstruction occurs simultaneously between the tapered sealing surface of the tapered bottom valve plug and the sealing surface of the bottom water outlet, and between the sealing surface of the side rotary sealing plates and the sealing surfaces of the side water inlets, it is advisable to promptly pull out the side water inlet emergency plug from the plug contact, place it into the side water inlets from outside, and rotate the rotary handle nut to push the tension disc into the gap cavity along the axis. This action is able to press the tension disc towards the tapered surface and force the rubber seal to bulge outward into the side water inlets, thus achieving the emergency shutdown of the side water inlets and further preventing the seawater from pouring into the cabin.

Two embodiments are provided herein. Embodiment 1 and embodiment 2 share the same working mechanism, but they have different configurations. In embodiment 1, the front sealing surfaces of the side rotary sealing plates are in parallel with their smooth back surfaces. The five degree angle between the smooth back surface and the central axis of the valve rod is achieved by the 5 degree tilting of the sealing surfaces of the side water inlets relative to the central axis of the valve rod. The holding piece on the top of the extensible side-sealing top-pressing assembly is a protruding column that sticks from the valve rod body. In embodiment 2, the sealing surfaces of the side water inlets are in parallel with the central axis of the valve rod. The five degree angle between the smooth back surface of the side rotary sealing plates and the central axis of the valve rod is achieved by forming a five degree angle between the smooth back surface and front sealing surface of the side rotary sealing plates. The holding piece on the top of the extensible side-sealing top-pressing assembly is a column-spring combination.

The safety discharge valve disclosed herein overcomes some of fatal flaws of the current art, which potentially eliminates the risk for valve fault/failure caused by intrinsic and/or extrinsic factors. A breakthrough is also achieved by making the valve still having reliable sealing function even at the fault state. This valve has significant technical and economic benefits and is thus expected to be widely applied to submarines and offshore oil platforms.

Except for the subject matters disclosed in this application, all other technical features are known or obvious to people having ordinary skill in the art.

The invention claimed is:

1. A safety discharge valve, comprising a siphon-type open/close device (1), a valve cover assembly (2), a valve rod (3), a valve body (4), an extensible side-sealing top-pressing assembly (5), side rotary sealing plates (6), a tapered bottom valve plug (7), and a side water inlet emergency plug (10); wherein, the siphon-type open/close device (1) is connected to the upper part of an open/close nut (8) on the valve cover assembly (2) through an inserted sealing connection; the top of the valve rod (3) is slidably connected with the center of the valve cover assembly (2) and is sealed inside a sealed valve rod cavity (62), below the bottom of the piston (24) and above a sealing filler (55) in the siphon-type open/close device (1); the lower part of the valve rod (3) is arranged inside of the valve body (4); two sides of the valve body (4) are provided with side water inlets (14) and the bottom of the valve body (4) is provided with the tapered bottom water outlet (16); the lower end of the valve rod (3) is connected with a tapered bottom valve plug (7); the lower tapered part of the tapered bottom valve plug (7) is matched with the tapered bottom water outlet (16); the extensible side-sealing top-pressing assembly (5) is arranged on the top of the tapered bottom valve plug (7) via a guide piece (15) on the valve rod (3); the top of the extensible side-sealing top-pressing assembly (5) presses upon a holding piece (11) on the valve rod (3); two top ends of each side of the extensible side-sealing top-pressing assembly (5) press upon smooth back surfaces of the side rotary sealing plates (6) in rolling-sliding contact therewith; the upper parts of the side rotary sealing plates (6) are rotatably connected with suspension brackets (12) on the inner wall of the valve body (4) through hinge pieces (13); the front sealing surfaces of the side rotary sealing plates (6) fittingly connect with inner sealing surfaces of the side water inlets (14); the smooth back surfaces of the side rotary sealing plates (6) are inclined at an angle of five degrees relative to the central axis of the valve rod (3); the side water inlet emergency plug (10) is extractably connected with an extractable cap (9) on the valve cover assembly (2); a piston (20) in the siphon-type open/close device (1) is slidably seal-connected with an inner wall of an inner main bushing body (19) through a sealing ring (26); the upper part of the open/close nut (8) in the valve cover assembly (2) and the siphon-type open/close device (1) are plug connected and sealed by a sealing ring (50); sealing pieces (51), (52), (53), (54) are sequentially arranged between the open/close nut (8), a gland bush (45), a bracket (46), a spinning sleeve (47) and a gland cover (48); space between the gland cover (48) and an annular stuffing slot (49) on the valve cover is filled with sealing fillers (55), and further seal-connected to the valve rod (3); an outer part of a guide and positioning bolt (60) is provided with a fixing nut (57); sealing gaskets (56), (58) are placed between the bracket (46) and the fixing nut (57), and between the fixing nut (57) and the head nut (59); a space below the bottom of the piston (24) and above the sealing filler (55) in the siphon-type open/close device (1) constitutes a sealed valve rod cavity (62).

2. The safety discharge valve according to claim 1, wherein the siphon-type open/close device comprises a downward opening container cover (18), the inner main bushing body (19) and the piston (20); the top end of the downward opening container cover (18) features an external drive connector (17); the top inner wall of the downward opening container cover (18) is connected with the inner main bushing body (19); a piston chamber (25) in the inner main bushing body (19) contains the piston (20); the piston (20) is slidably seal-connected with the inner wall of the inner main bushing body (19) through a sealing ring (26); the lower part of the inner main bushing body (19) is provided with a connector (22); inside the connector (22) an annular seal surface (21) is provided; the top end of the inner main bushing body (19) is provided with a through-hole (23) that connects the piston chamber (25) with the breathing chamber (24); a volume of the breathing chamber (24) below the lowest point of the through-hole (23) is larger than a volume of the piston chamber (25) between the upper surface of the piston (20) and the lowest point of the through-hole (23) when the piston (20) is at its lowest position.

3. The safety discharge valve according to claim 1, wherein the extensible side-sealing top-pressing assembly comprises a main body (27), an extensible piece (28), a connecting piece (29), and a roller or a smooth contact head (30); an inner wall of a longitudinal hole (31) within the main body (27) is provided with a longitudinal guide groove (32); the extensible piece (28) is arranged between each of the two ends of the main body (27) and the connecting piece (29); each of the two top ends of the connecting piece (29) is provided with a roller or a smooth contact head (30); the extensible piece (28) of the extensible side-sealing top-pressing assembly is a spring or a spring plate.

4. The safety discharge valve according to claim 1, wherein each of the side rotary sealing plates is provided with an arc-shaped hanger (33), a hanging hole (34), a smooth touch surface (35), and a front sealing surface (36).

5. The safety discharge valve according to claim 1, wherein the side water inlet emergency plug comprises a tension disc (37), a fixed disc (38), a rubber seal (39) and a rotary handle nut (40); an outside of the tension disc (37) is cone-shaped, and its inside is provided with a stud (41); the stud (41) slides through a center hole of the fixed disc (38) and connects with the rotary handle nut (40); the fixed disc (38) is in fitting contact with a positioning bore surface of the rubber seal (39); a bore of the rubber seal (39) is cone-shaped, and an inner conical surface of the bore is in fitting contact with an outer conical surface of the tension disc (37); the rubber seal (39) has a cylindrical outer surface, with its diameter the size such that it can be slidably inserted into the side water inlets (14); an outer bottom of the tension disc (37) is provided with a socket (42); inside the socket (42) is arranged a fastening ring (43); a gap cavity (44) is arranged between the tension disc (37) and the fixed disc (38).

6. The safety discharge valve according to claim 1, wherein the outer bottom of the valve body (4) is provided with a flange (61).

7. The safety discharge valve according to claim 1, wherein the holding piece (11) is a protruding column of the valve rod body or a column-spring combination.

\* \* \* \* \*